United States Patent
Calder et al.

(10) Patent No.: US 9,835,112 B2
(45) Date of Patent: Dec. 5, 2017

(54) THRUST REVERSER CASCADE

(71) Applicant: MRA Systems, Inc., Baltimore, MD (US)

(72) Inventors: David Patrick Calder, Baltimore, MD (US); Graham Frank Howarth, Middletown, DE (US)

(73) Assignee: MRA Systems Inc., Baltimore, MD (US)

( * ) Notice: Subject to any disclaimer, the term of this patent is extended or adjusted under 35 U.S.C. 154(b) by 788 days.

(21) Appl. No.: 14/176,200

(22) Filed: Feb. 10, 2014

(65) Prior Publication Data

US 2015/0226157 A1 Aug. 13, 2015

(51) Int. Cl.
*F02K 1/72* (2006.01)
*B33Y 80/00* (2015.01)

(52) U.S. Cl.
CPC .............. *F02K 1/72* (2013.01); *B33Y 80/00* (2014.12); *F05D 2230/31* (2013.01); *F05D 2300/603* (2013.01); *Y02T 50/672* (2013.01)

(58) Field of Classification Search
CPC ..... F02K 1/64; F02K 1/70; F02K 1/72; F02K 1/54; F02K 1/68
USPC ...................................................... 244/110 B
See application file for complete search history.

(56) References Cited

U.S. PATENT DOCUMENTS

| | | | | |
|---|---|---|---|---|
| 2,644,296 A | * | 7/1953 | Sanz ................. | F42B 10/64 244/3.21 |
| 2,929,755 A | * | 3/1960 | Porter ................ | F01D 5/282 156/185 |
| 3,248,082 A | * | 4/1966 | Whitfield ........... | F01D 5/28 416/229 R |
| 3,647,317 A | * | 3/1972 | Furlong ............. | F04D 29/388 416/226 |
| 3,794,246 A | * | 2/1974 | Weise ................ | F02K 1/56 239/265.33 |
| 3,883,267 A | * | 5/1975 | Baudier ............. | F01D 5/282 416/230 |
| 3,892,612 A | * | 7/1975 | Carlson ............. | F01D 5/282 156/150 |
| 4,173,307 A | * | 11/1979 | Ittner ................. | B23P 15/006 239/265.29 |
| 4,596,621 A | * | 6/1986 | Nawaz ............... | F02K 1/605 156/245 |
| 4,722,821 A | * | 2/1988 | Vermilye ........... | B29C 45/14631 264/261 |

(Continued)

FOREIGN PATENT DOCUMENTS

CN        103047048 A     4/2013
EP          1638758 A2     3/2006

(Continued)

OTHER PUBLICATIONS

PCT Search Report and Written Opinion issued in connection with corresponding PCT Application No. PCT/US2015/010735 dated Apr. 13, 2015.

(Continued)

*Primary Examiner* — Justin Larson
(74) *Attorney, Agent, or Firm* — General Electric Company; William Scott Andes

(57) ABSTRACT

A thrust reverser cascade having a frame and a body. The body comprises multiple layers formed by an additive manufacturing process where at least one of the layers is coupled to the frame.

4 Claims, 5 Drawing Sheets

(56) References Cited

U.S. PATENT DOCUMENTS

| | | | | |
|---|---|---|---|---|
| 4,778,110 | A * | 10/1988 | Sankey | F02K 1/605 239/265.29 |
| 4,852,805 | A * | 8/1989 | Vermilye | B29C 45/14631 239/265.11 |
| 4,971,641 | A * | 11/1990 | Nelson | B64C 11/26 156/245 |
| 5,123,814 | A * | 6/1992 | Burdick | F04D 29/388 29/889.3 |
| RE34,207 | E * | 3/1993 | Nelson | B64C 11/20 416/144 |
| 5,308,228 | A * | 5/1994 | Benoit | B29C 70/543 156/93 |
| 5,785,919 | A | 7/1998 | Wilson | |
| 6,210,773 | B1 * | 4/2001 | Moore | B29C 70/08 244/110 B |
| 6,725,541 | B1 * | 4/2004 | Holme | F02K 1/54 29/889.2 |
| 7,008,689 | B2 | 3/2006 | Hawkins | B32B 3/08 428/212 |
| 8,484,944 | B2 * | 7/2013 | Urban | F02K 1/72 239/265.25 |
| 8,734,925 | B2 * | 5/2014 | Kweder | B29C 70/46 264/257 |
| 8,904,751 | B2 * | 12/2014 | Howarth | 239/265.31 |
| 9,016,042 | B2 * | 4/2015 | Chiou | F02K 1/60 137/15.1 |
| 2007/0251760 | A1 | 11/2007 | Baarck et al. | |
| 2013/0092755 | A1 | 4/2013 | Aten et al. | |
| 2013/0101406 | A1 * | 4/2013 | Kweder | B29C 70/46 415/200 |
| 2014/0248156 | A1 * | 9/2014 | Parkos, Jr. | F01D 25/005 416/229 R |
| 2015/0226157 | A1 * | 8/2015 | Calder | B33Y 80/00 60/228 |
| 2015/0285184 | A1 * | 10/2015 | Sawyers-Abbott | F02K 1/70 60/230 |
| 2016/0016669 | A1 * | 1/2016 | Cazuc | B64D 29/06 415/213.1 |
| 2016/0153287 | A1 * | 6/2016 | Roach | C25D 7/00 415/119 |
| 2016/0160681 | A1 * | 6/2016 | Roach | F01D 25/005 415/177 |
| 2017/0057166 | A1 * | 3/2017 | Soria | F02K 1/56 |

FOREIGN PATENT DOCUMENTS

| | | | |
|---|---|---|---|
| EP | 2570595 A1 | 3/2013 | |
| EP | 3141375 A1 * | 3/2017 | B29C 67/0081 |
| GB | 2452476 A | 3/2009 | |
| WO | 2004022319 A1 | 3/2004 | |
| WO | 2011036068 A2 | 3/2011 | |

OTHER PUBLICATIONS

Unofficial English Translation of Chinese Office Action issued in connection with corresponding CN Application No. 201580008019.3 dated Feb. 16, 2017.

* cited by examiner

9,835,112 B2

THRUST REVERSER CASCADE

BACKGROUND OF THE INVENTION

Contemporary aircraft engines may include a thrust reverser system to assist in reducing the aircraft speed during landing. Typical thrust reversers include a movable element that when in the active position directs airflow through a thrust reverser cascade that reverses at least a portion of the airflow passing through the engine. Thrust reverser cascades are typically made from cast aluminum or a graphite/resin composite using resin transfer molding processes or labor intensive lay-up processes.

BRIEF DESCRIPTION OF THE INVENTION

In one aspect, an embodiment of the invention relates to a thrust reverser cascade having a frame and a body. The body comprises multiple polymer resin layers formed by an additive manufacturing process with at least one of the layers coupled to the frame.

DESCRIPTION OF EMBODIMENTS OF THE INVENTION

Figure 1:
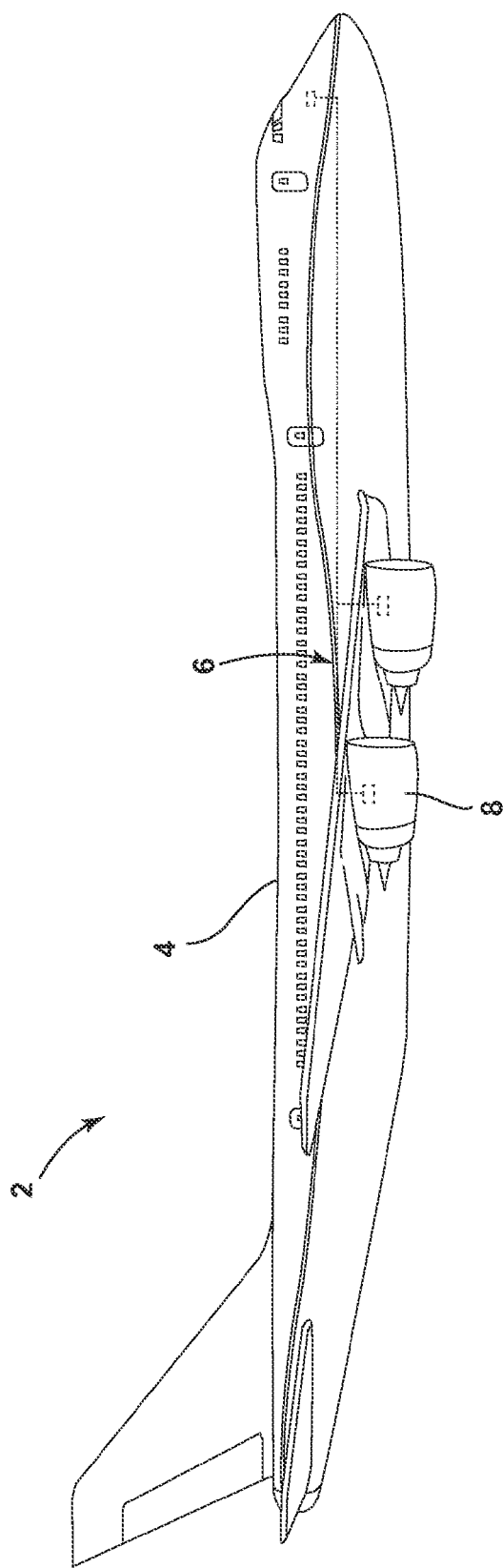
FIG. 1 is a side view of an aircraft with multiple engine assemblies, such as a turbofan jet engine assembly, having a thrust reverser.

FIG. 1 illustrates an aircraft 2 having a fuselage 4 with wing assemblies 6 extending outward from the fuselage 4. One or more turbofan jet engine assemblies 8 may be coupled to the aircraft 2 to provide propulsion. A pylon may be configured for securing one of the jet engine assemblies 8 to a portion of the aircraft 2. In the illustrated example, each jet engine assembly 8 is operably coupled to a wing assembly 6. While a commercial aircraft 2 has been illustrated, it is contemplated that embodiments of the invention may be used in any type of aircraft, for example, without limitation, fixed-wing, rotating-wing, and military aircraft.

Figure 2:
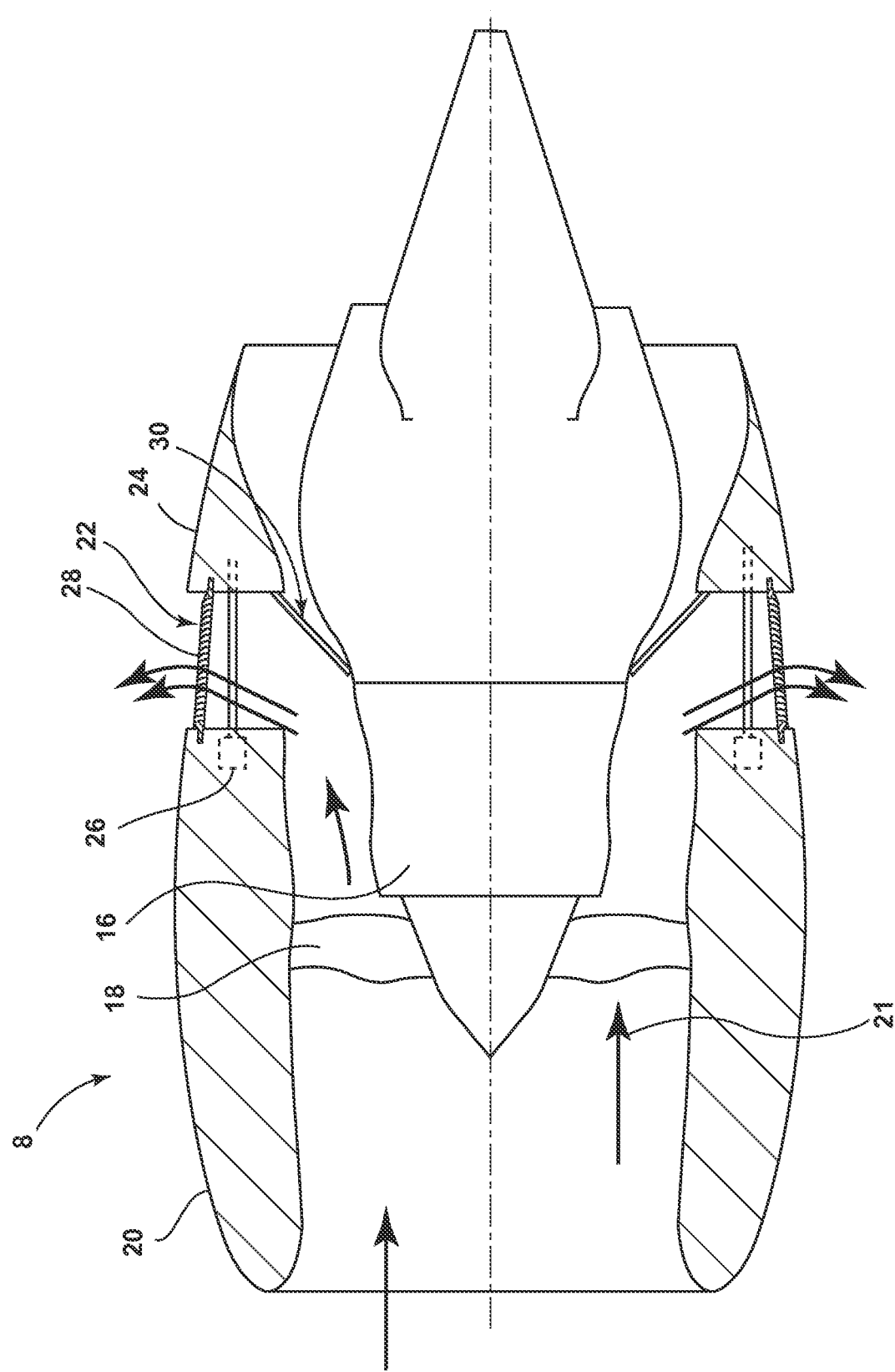
FIG. 2 is a schematic sectional view of a portion of a turbofan jet engine assembly of FIG. 1, with a thrust reverser having a thrust reverser cascade.

As illustrated more clearly in FIG. 2, each turbofan jet engine assembly 8 may include a turbine engine 16, a fan assembly 18, and a nacelle 20. Portions of the nacelle 20 have been cut away for clarity. The nacelle 20 surrounds the turbine engine 16 and defines an annular airflow path or annular bypass duct through the turbofan jet engine assembly 8 to define a generally forward-to-aft bypass airflow path as illustrated by the arrows 21.

A thrust reverser 22 with at least one movable element 24, which is movable to and from a reversing position, a blocker door 30 and a thrust reverser cascade 28 may be used to change the direction of the bypass airflow. In the reversing position, the movable element (i.e. the transcowl) 24 and thrust reverser cascade 28 may be configured to reverse at least a portion of the bypass airflow. There are several methods of obtaining reverse thrust on turbofan jet engine assemblies 8. For exemplary purposes, one example of a thrust reverser 22 that may be used in the turbofan jet engine assembly 8 has been illustrated. The thrust reverser 22 includes at least one moveable control surface or movable element 24, a blocker door 30 and a thrust reverser cascade 28. The movable element 24 has been illustrated as a slidable portion of an outer cowling that is capable of axial motion with respect to the forward portion of the nacelle 20. A hydraulic (or pneumatic, or electric, or electro-hydraulic) actuator 26 may be coupled to the movable element 24 to move the movable element 24 and/or a blocker door 30 into and out of the reversing position. In the reversing position, as illustrated, the blocker door 30 limits the annular bypass area between the movable element 24 and the turbine engine 16, it also opens up a portion between the movable element 24 and the forward portion of the nacelle 20 such that the air flow path may pass through the thrust reverser cascade 28 and be reversed as illustrated by the arrows. The thrust reverser cascade 28 aids in directing the airflow path between the movable element 24 and the forward portion of the nacelle 20. The thrust reverser cascade 28 may include a plurality of airfoil shaped vanes configured to optimize the airflow path. The thrust reverser cascade 28 changes the direction of the thrust force by reversing at least a portion of the bypass airflow.

Figure 3:
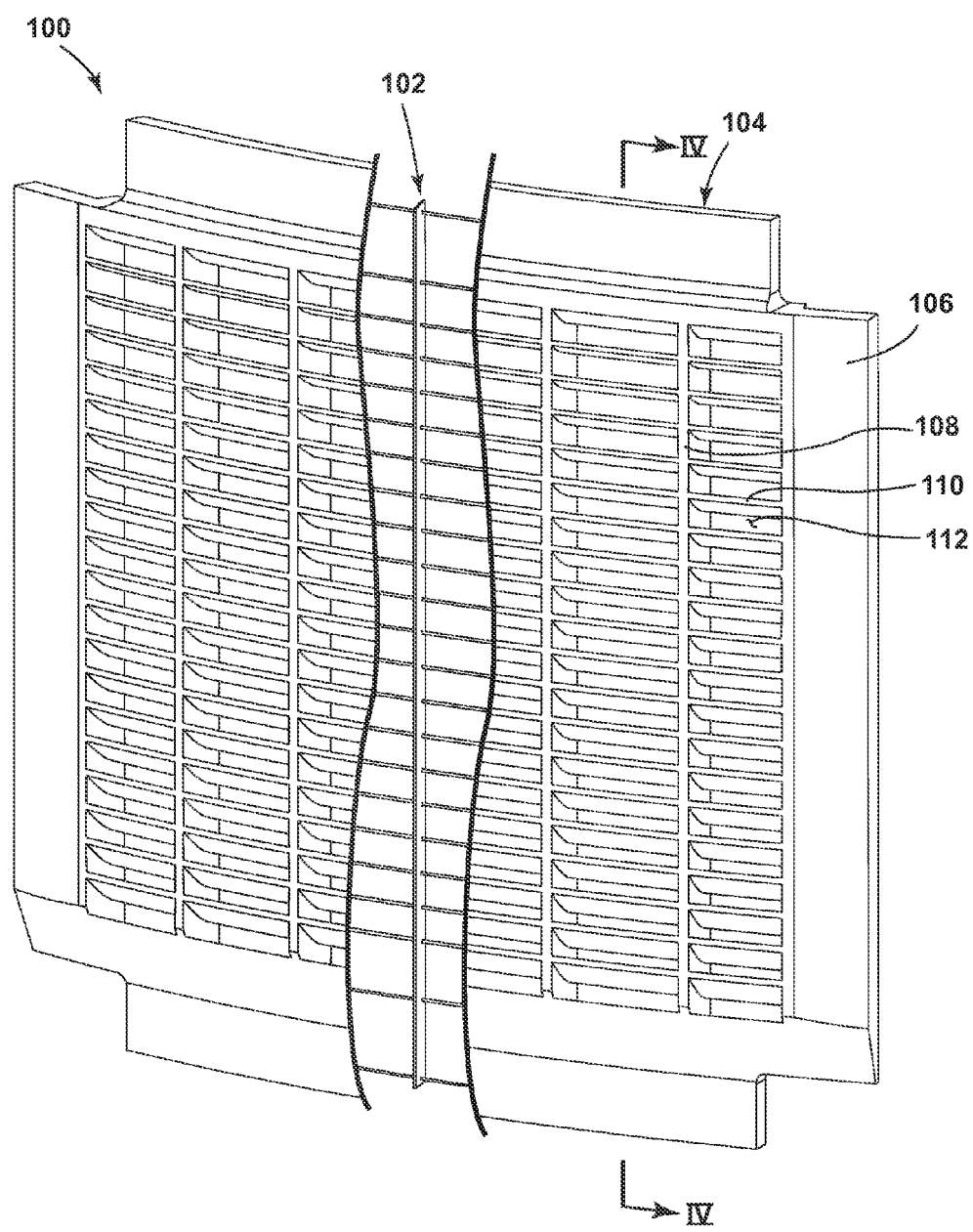
FIG. 3 is perspective view of a thrust reverser cascade according to an embodiment of the invention, and suitable for use in the turbofan jet engine of FIG. 2.

FIG. 3 illustrates a thrust reverser cascade 100 according to an embodiment of the invention. The thrust reverser cascade 100 cross-sectional taken along line IV-IV corresponds to the thrust reverser cascade 28 shown in FIG. 2. The thrust reverser cascade 100 comprises a frame 102 and a body 104. The frame 102 and body 104 form a mounting portion 106, support rails 108 and vanes 110. The support rails 108 and vanes 110 define a plurality of airflow passages 112.

The support rails 108 attach to the mounting portion 106. The vanes 110 attach to the support rails 108. The mounting portion 106 surrounds the support rails 108 and the vanes 110 and may include mounting holes, not pictured, integrally formed in the body 104 and frame 102. The mounting portion 106, support rails 108 and vanes 110 all comprise a frame 102 portion and a body 104 portion wherein the frame 102 is coupled to the body 104. The coupling of the frame to the body may be achieved by mechanical locking as a result of geometry or features similar to dovetails or by the use of adhesive or other bonding materials.

The frame 102 comprises a metallic or a graphite/resin composite structure formed from either an additive manufacturing process, a machining process, or assembled from various small and simple components that may be machined, molded, welded, bonded, dovetailed or mechanically fastened together. The frame 102 forms a skeleton such as a simple monolithic grid that provides structural integrity for the thrust reverser cascade 100 so as to meet a plurality of requirements.

Figure 6:
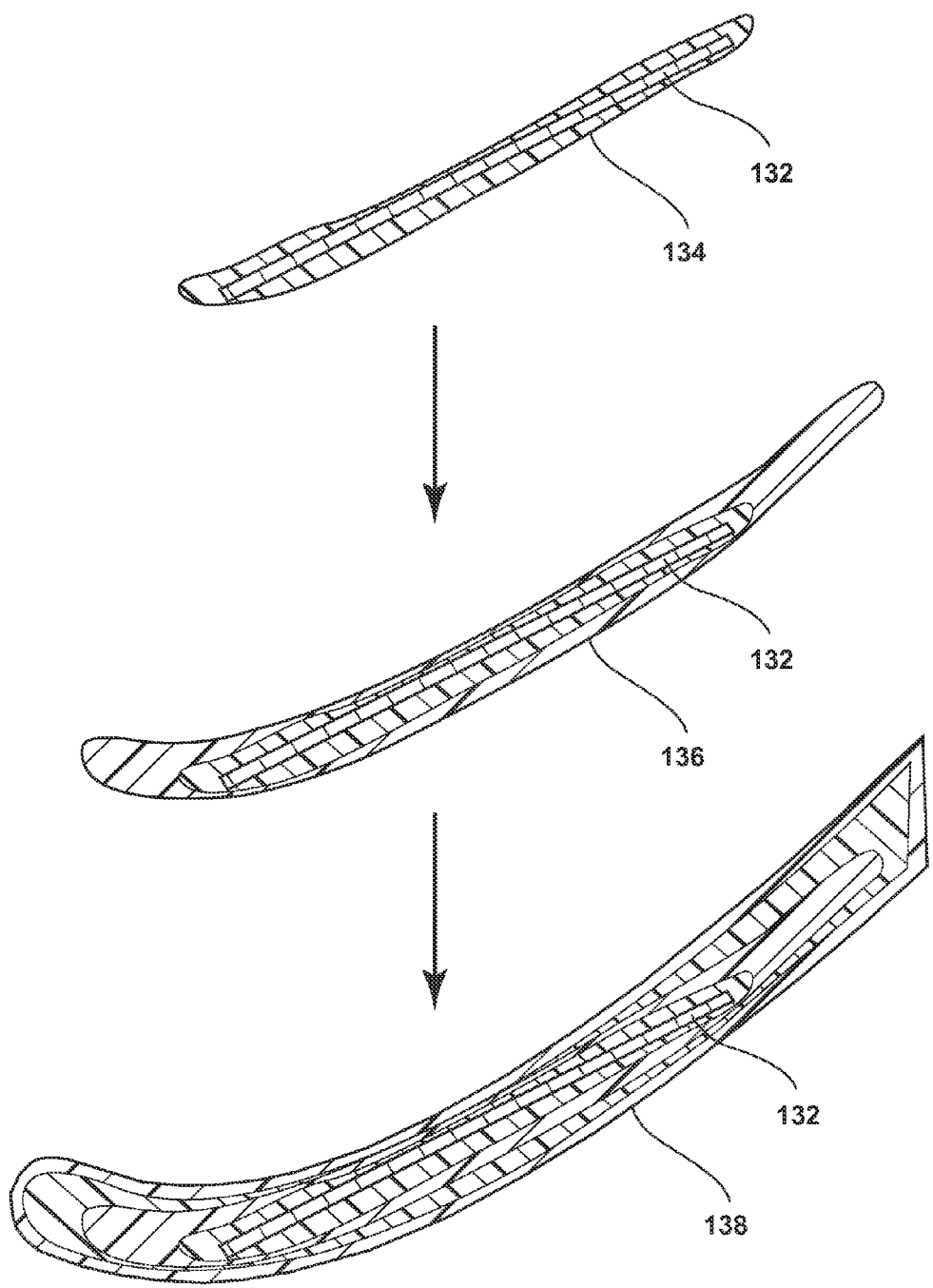
FIG. 6 is a section view of a thrust reverser cascade vane showing the addition manufacturing process.

The body 104 comprises multiple polymer or resin layers, best seen in FIG. 6, formed by an additive manufacturing process. The body 104 provides the aerodynamics of the thrust reverser so as to meet the reverse thrust and airflow requirements. At least one of the resin layers is coupled to the frame 102 so as to join the frame 102 and the body 104 forming the thrust reverser cascade 100.

The thrust reverser cascade 100 is mounted to the nacelle 20, shown in FIG. 2, at the mounting portion 106. When air is diverted through the thrust reverser cascade 100, air flows through the airflow passages 112 and provides the reverse thrust.

Figure 4:
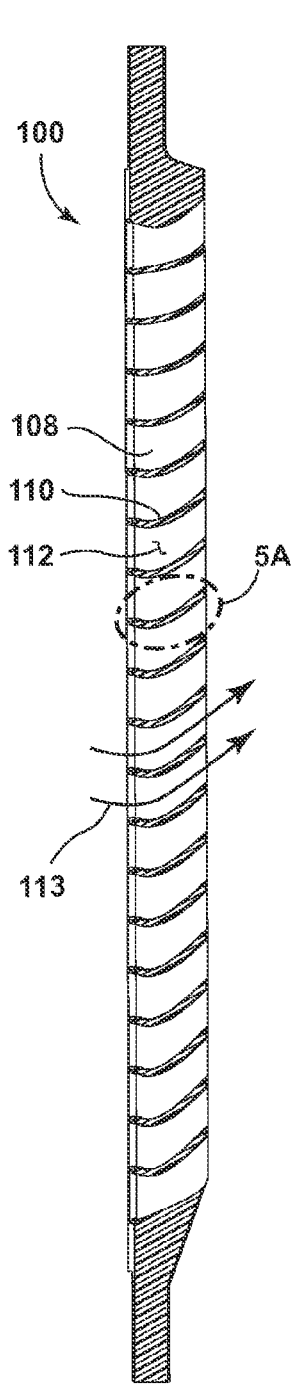
FIG. 4 is cross-sectional taken along line IV-IV of FIG. 3.

FIG. 4 shows the cross section view of section IV of FIG. 3. The vanes 110 have an airfoil cross section configured to optimize the airflow through the airflow passages 112 of the thrust reverser cascade 100. When the thrust reverser is actuated, the airflow through the thrust reverser cascade 100 is shown by the direction arrows 113 in FIG. 4, which correspond to the direction arrows 30 in FIG. 2.

Figure 5A:
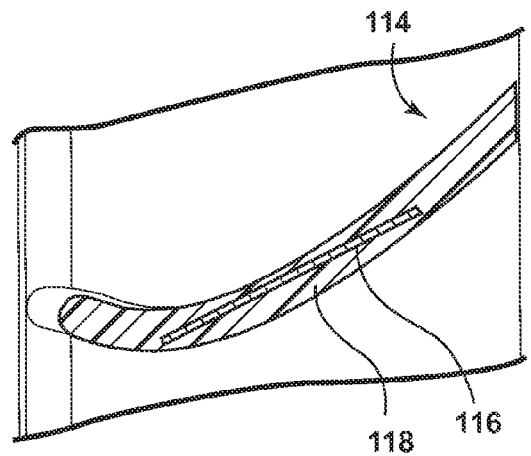
FIG. 5A is a section view of detail 5A of FIG. 4 according to an embodiment of the invention.
Figure 5B:
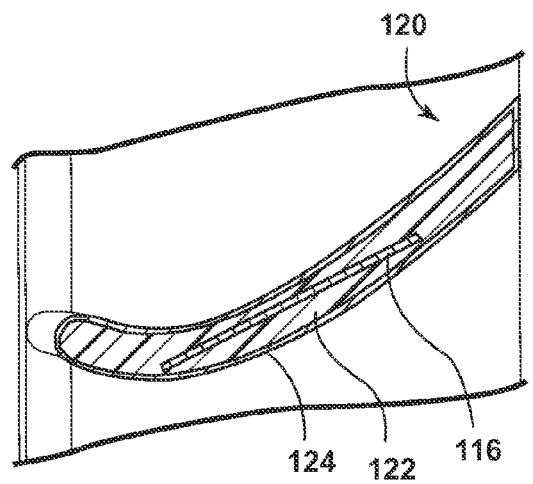
FIG. 5B is a section view of detail 5A of FIG. 4 according to another embodiment of the invention.
Figure 5C:
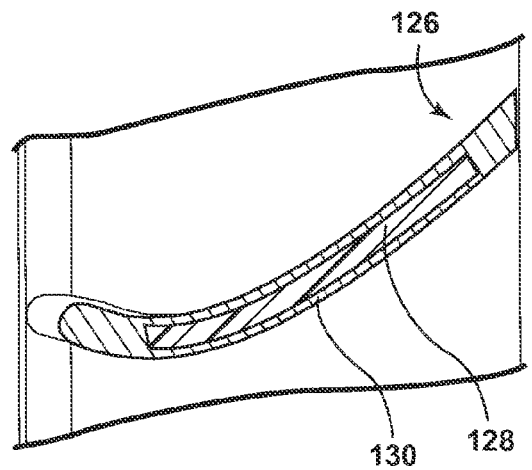
FIG. 5C is a section view of detail 5A of FIG. 4 according to yet another embodiment of the invention.

FIGS. 5A, 5B and 5C illustrate different embodiments of the invention. For clarity, only the vane cross section will be shown to describe the frame and body configuration but it will be understood that the frame and body configurations as described herein after for each embodiment may apply to the entire thrust reverser cascade.

FIG. 5A shows a section view of detail 5A of FIG. 4 according to an embodiment of the invention. A vane 114 comprises an internal frame 116 which forms a skeleton for the thrust reverser cascade. The body 118 at least partially envelopes the internal frame 116.

The frame may be formed by an additive manufacturing process, a machining process, or assembled from various small and simple components that may be machined, molded, welded, bonded, dovetailed or mechanically fastened together. The internal frame 116 may be made from materials that may include aluminum, magnesium, titanium, steel, or a graphite/resin composite.

The body 118 is formed over the internal frame 116 by applying layers of resin to the internal frame 116 using an additive manufacturing process. The layers of resin form the airfoil shape of the vane 114 to achieve desired aerodynamics of the thrust reverser cascade.

FIG. 5B shows a section view of detail 5A of FIG. 4 according to another embodiment of the invention. The embodiment shown in FIG. 5B is generally similar to that of FIG. 5A. It is similar in that the vane 120 has the same internal frame 116 and a body 122 that at least partially envelopes the internal frame 116 and also that the body 122 is formed over the internal frame 116 by applying layers of resin to the internal frame 116 using an additive manufacturing process. It is different in that the body 122 may be made slightly undersized so as to apply a metallic coating 124 to the outer surface of the body 122 to aid in erosion control. The metallic coating 124 may be applied using an additive manufacturing process or coating methods known in the art.

FIG. 5C is a section view of detail 5A of FIG. 4 according to yet another embodiment of the invention. A vane 126 comprises an external frame 130 which forms an exoskeleton for the thrust reverser cascade. The external frame 130 forming the exoskeleton at least partially envelopes the body 128.

The body 128 is formed from a polymer or resin using an additive manufacturing process. The external frame 130 is formed over the body 128 by applying layers of metallic material or a resin/graphite composite to the body 128 using an additive manufacturing process. The external frame 130 forms the airfoil shape of the vane 126 to achieve proper aerodynamics of the thrust reverser cascade. It should be noted in FIGS. 5A and 5B that the frame 116 may be flat as shown in 5A and 5B, or it may be any geometry that meets the structural and/or aerodynamic requirements.

FIG. 6 shows a sectional view of a thrust reverser cascade vane showing the addition of polymer or resin layers to an internal frame 132 to form the body of the thrust reverser cascade. Using an additive manufacturing process, a first layer 134 of resin is applied over the internal frame 132. Intermediate layers 136 of resin are added to the preceding layer with each layer contributing to the overall shape of the body. The final layer 138 completes the body giving the vane the desired airfoil shape and therefor the desired aerodynamics. It will be understood that this process may also be used to apply an external frame exoskeleton or a metallic coating to the body.

It will be understood that an additive manufacturing process relates to building the part by the addition of material. One known additive process is three-dimensional (3D) printing, which is the process of making a 3D object from a digital model using resins, polymers, metal particles or some combination thereof. The process typically uses a 3D printer which is a type of industrial robot capable of carrying out the additive manufacturing process under computer control.

The different embodiments of the thrust reverser cascade including a frame and a body may be configured to meet a variety of requirements present in the field of thrust reverser cascades including of cost, service life, aerodynamics, weight, strength, stiffness, load transfer, durability and erosion resistance. Both the dimensioning of the frame and body and the materials of construction for the frame and the body are chosen to achieve these requirements which are not achievable using an additive manufacturing process consisting of a single material. The embodiments as described herein provide a thrust reverser cascade that may achieve a significant service life, typically up to and beyond 50,000 hours without failure or replacement. The embodiments as described herein also provide a thrust reverser cascade that has a weight that is less than if the thrust reverser cascade were made from 100% cast aluminum. Furthermore, the embodiments as described herein also provide a thrust reverser cascade that has a strength that is greater than if the thrust reverser cascade were made from 100% cast aluminum.

The embodiments described above provide for a variety of benefits including that a thrust reverser cascade according to the invention may be made to meet all requirements of service life, aerodynamics, weight, strength, stiffness, load transfer, durability and erosion resistance while costing significantly less than current resin/graphite composite resin transfer molded and hand lay-up thrust reverser cascades and having lower weight and greater strength than current cast aluminum thrust reverser cascades. Furthermore, by utilizing the additive manufacturing process, different iterations of design to optimize aerodynamics and airflow may be executed by simple changing the additive manufacturing process program, thereby eliminating the need for expensive tool and die changes needed for other thrust reverser cascades, as well as provide a process that is fully automated and has a rapid cycle time. The materials utilized may be selected from a range of materials including resins, polymers, fiber reinforced polymers, polymer/metal combinations and metal particles available for the additive manufacturing process To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thrust reverser cascade comprising:
   a metal structural skeleton frame comprising a monolithic grid; and
   a body comprising a plurality of vanes formed using multiple resin layers formed on the metal structural skeleton frame by an additive manufacturing process.

2. The thrust reverser cascade of claim 1 wherein the frame is at least partially enveloped by at least a portion of the body.

3. The thrust reverser cascade of claim 2 wherein the frame is completely enveloped by the body.

4. The thrust reverser cascade of claim 1 wherein at least some of the vanes have an airfoil cross section.

* * * * *